UNITED STATES PATENT OFFICE.

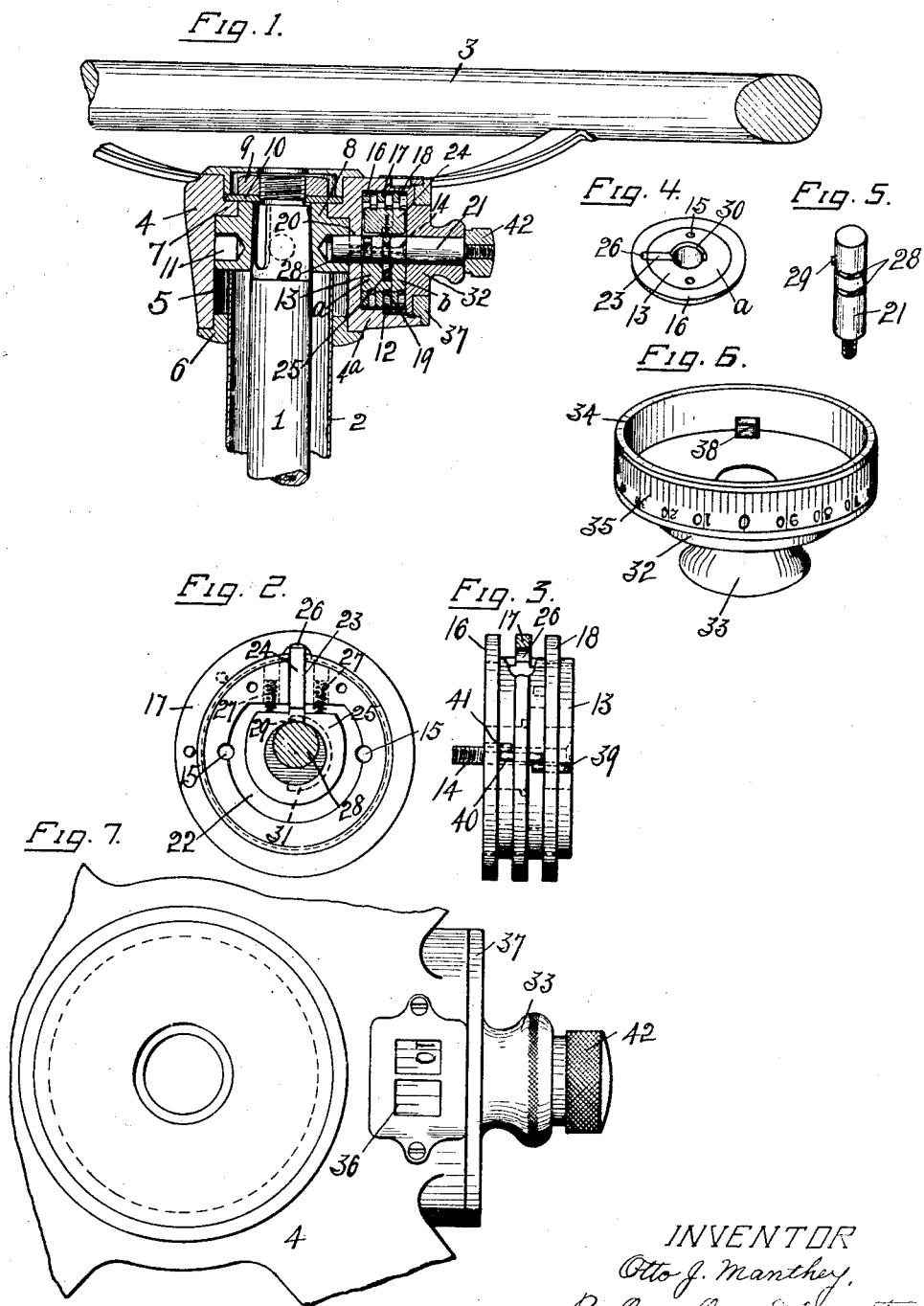

OTTO J. MANTHEY, OF TOLEDO, OHIO, ASSIGNOR, BY DIRECT AND MESNE ASSIGNMENTS, TO RALPH H. CULLEY, OF ROCHESTER, NEW YORK.

PERMUTATION-LOCK FOR STEERING-WHEELS.

1,347,516.

Specification of Letters Patent.  Patented July 27, 1920.

Application filed June 21, 1919. Serial No. 305,807.

*To all whom it may concern:*

Be it known that I, OTTO J. MANTHEY, a citizen of the United States, and a resident of Toledo, in the county of Lucas and State of Ohio, have invented certain new and useful Permutation - Locks for Steering - Wheels; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to locking mechanisms, and particularly to a mechanism of this type adapted for locking the hand steering wheel of automobiles, motor boats, or the like, to its steering point or shaft.

An object of my invention is the provision of a simple, efficient and improved locking mechanism of this character, which is carried by the steering wheel in the hub portion thereof, and is operable to lock and hold the wheel to the steering post and to permit a free turning of the wheel on the post and prevent a turning engagement of the wheel with the post.

The invention is fully described in the following specification, and while, in its broader aspect, it is capable of embodiment in numerous forms, a preferred embodiment thereof is illustrated in the accompanying drawings, in which,—

Figure 1 is a sectional view of the invention in association with the steering wheel and its carrying means, with the locking mechanism in locking position. Fig. 2 is a detail of a portion of the locking mechanism removed from the wheel hub and with the bolt shaft in section, and coöperating with the locking dog to lock the combination rings against movement and to permit an axial movement of the bolt shaft. Fig. 3 is a fragmentary side elevation of the core portion of the locking means and the combination rings mounted thereon, with a part broken away. Fig. 4 is a perspective view of the inner side of the lock mechanism core and a locking ring thereon. Fig. 5 is a perspective view of the bolt shaft. Fig. 6 is a perspective view of the index wheel, and Fig. 7 is an enlarged fragmentary top plan view of the steering wheel hub and locking mechanism.

Referring to the drawings, 1 designates the customary steering post, which may be connected to the steering gear of an automobile, motor boat, or the like, 2 the inclosing sleeve or column for the steering post, and 3 the steering wheel which is mounted on the steering post and intended to be fixed thereto when the steering mechanism is being operated. The hub 4 of the steering wheel has an axial bore 5 preferably of a size to receive the largest column 2, customarily used to adapt the wheel for use on different steering mechanisms, and if the bore is too large for the column 2, a bushing 6 may be employed at the lower end of the bore, being of suitable size to center the column therein. The hub bore 5 is provided adjacent to its upper or outer end with an internal shoulder 7, and a lock collar 8 is fixed to the upper end of the post 1 and is rotatably fitted into the hub bore at the end of the column 2 and in abutment with the shoulder 7, with a reduced end portion thereof fitting within said shoulder. The wheel hub is retained in rotatable engagement with the collar 8 by a nut 9 and washer 10, the former being threaded on the post end and the latter coacting with the outer end of the shoulder 7, as shown. The collar 8 is provided in its periphery with one or more holes or sockets 11 with which the bolt member of the locking mechanism may be engaged.

The hub 4 is provided in one side with a lateral enlargement 4ª having a cylindrical socket 12 in its outer side with its axis in radial relation to the hub axis. Two separable members *a* and *b*, forming the cylindrical core 13, are secured together and also held centrally in the socket 12 by a pair of screws 14, which are inserted through registering openings 15 in the core and thread into the base of the socket. The core 13 is of less diameter than the socket 12 to provide an annular space therebetween, and the periphery of the core is formed, in the present instance, with three annular grooves or ring seats in which the combination locking rings 16, 17 and 18 are mounted for free relative turning movements. In the present instance, a portion of the wall of the ring receiving grooves are formed by split spacing rings 19, which may be removed from the core to permit a removal of the locking rings. The core 13 and bottom of the hub socket 12 are provided axially therethrough with an opening 20 with which any one of the sockets 11 in the collar 8 may be placed in register, and a bolt shaft 21 is mounted in the opening 20 for radial and axial movements therein, and is adapted, when axially moved, to have its inner end projected into a registering collar socket 11 to lock the hub against turning relative to the collar, or to be withdrawn from such socket. The outer end of the bolt shaft projects out beyond the core 13 and without the hub socket 12.

The core 13 is provided internally thereof with a chamber 22 surrounding the bolt shaft 21, access to which chamber may be had by a separation of the core members, and in one side of the core is provided a radially extending slot 23 which has communication with the chamber 22 at its inner end and has its outer end extending to the outer periphery of the core. This slot in length is coextensive with the length of the core. A dog 24 is mounted in the slot 23 for radial movements therein and is provided at its inner end with a collar part 25 which is disposed within the core chamber 22 for transverse movements therein and has its center opening of a size to fit the bolt shaft 21. Each of the combination locking rings 16, 17 and 18 is provided in its inner edge with a notch 26, which, when in transverse register with each other and in register with the dog 24, permit an outward movement of the dog relative to the core, as shown in Fig. 2. Springs 27 project into the chamber 22 from interior sockets in the core 13 and act against the collar 25 to normally retain the dog 24 in retracted position or withdrawn from the notches 26 in the combination rings.

The bolt shaft 21 is provided with two axially spaced eccentric portions 28 entirely within the circumference of the shaft, as shown in Fig. 2, and each of these may be placed within the opening of the collar 25 so that a turning of the shaft will cause the eccentric to act on the collar 25 to force the dog 24 outward into the registering ring notches 26, or to permit a retraction of the dog to inoperative position. When the dog is in its retracted position the coöperating eccentric 28 is disposed at the lower portion of the bolt shaft 21 or in remote relation to the ring notches 26 so that the walls of the shaft groove forming the eccentric will coact with the collar 25 to prevent an axial movement of the bolt shaft, as shown in Fig. 1, whereas when the eccentric is at the upper side of the shaft, or adjacent to the ring notches, the axis of the opening in the collar 25 will coincide with that of the bolt shaft 21 and permit a longitudinal shifting of the bolt shaft to move its inner end into or out of engagement with a socket 11 in the steering post collar 8. When the bolt shaft is projected inwardly into locking engagement with the collar 8, as shown in Fig. 1, a radially projecting stud 29 on the periphery thereof engages within a segmental recess 30 in the inner side of the core 13 to limit the rotation of the bolt shaft to a half turn, one end of said recess terminating at the slot 23 of the core so that the stud 29 may be moved through said slot axially of the core upon an outward longitudinal movement of the bolt shaft. Likewise when the bolt is in released position or at the limit of its outward movement the stud 29 will be disposed in a segmental recess 31 disposed in the inner side of the member a of the core, which recess terminates at one end with the slot 23. The purpose of the stud 29 and the slots 30 and 31 is to permit only a sufficient turning of the bolt shaft 21 to place its eccentrics 28 at the top or bottom of the shaft axis so that the dog 24 is either completely projected or retracted relative to the core.

An index wheel 32 is mounted on the bolt shaft 21 without the core 13 and rotatably fits within the outer end of the hub socket 12 to close the same. This wheel has a knob 33 on its outer end for facilitating a turning thereof and is provided at its outer peripheral edge with an inwardly projecting cylindrical flange 34, which is provided with an index or numbered graduation 35, which may be viewed through a window 36 in the upper end of the hub. The wheel 32 is rotatably contained in closing relation to the socket 12 by a collar 37 which is threaded into the outer edge of the socket at the outer marginal edge portion of the wheel. The wheel 32 is provided longitudinally thereof with a lug 38 in the path of movement of the adjacent end of a pin 39, which is projected through and extends in opposite directions from the outer combination ring 18, whereby a turning of the wheel 32 in either direction will cause the lug 38 to coact with the outer end of the pin 39 and impart a predetermined turning movement to the ring 18. The ring 17 is provided with a similar pin 40, one end of which is adapted to be engaged by the adjacent end of the pin 39 when the ring 18 is turned in either direction and to then impart movement to the ring 17, while the other end of the pin 40 is adapted to engage in a like manner with a pin 41 on the adjacent side of the ring 16 to impart rotation to said ring. It is thus evident that the rings 16, 17 and 18 may be successively turned into position for the notches 26 therein to register with the dog 24, and that when all of said notches have been placed in register with the dog the bolt shaft 21 may be given a half turn to force the dog 24 outward so as to place the collar 25 which locks the shaft against longitudinal movements into position to permit such movement.

The bolt shaft 21 is provided at its outer end with a knob or thumb-piece 42, which is threaded thereon and abuts against the outer hub end of the wheel 32 to prevent a removal thereof from the shaft until the knob 42 has been removed.

The operation of my locking means is as follows:—If the bolt shaft 21 is in locking engagement with the steering post collar 8 with the dog 24 in retracted position, as shown in Fig. 1, and the combination rings 16, 17 and 18 turned so that their notches 26 are out of register, the index wheel 32 is turned to different predetermined index designations to successively turn the rings 16, 17 and 18 to place the notches 26 therein in register with the dog 24. The knob 42 and attached bolt shaft 21 are then given a half turn to force the dog 24 outward into the ring notches 26 and to place the opening through the shaft locking collar 25 into axial register with the shaft and with the stud 29 thereon in register with the core slot 23. The bolt shaft is then drawn outward to place the inner eccentric 28 into register with the lock collar 25 and the bolt shaft is then given a half turn to effect a retraction of the dog 24 from locking engagement with the rings 16, 17 and 18 after which the index wheel is given a spin to throw the notches 26 in the locking rings 16, 17 and 18 out of register with each other and with the dog 24, thus locking the bolt shaft in its retracted or released position. When the bolt shaft is in this released position the steering wheel 3 is free to turn on the steering post collar 8. It will be understood that substantially the same operation is carried out to unlock the bolt shaft 21 and move it into engagement with the collar 8 and lock it in such position.

I wish it understood that my invention is not limited to any specific construction, arrangement or form of the parts, as it is capable of numerous modifications and changes without departing from the spirit of the claims.

Having thus described my invention, what I claim as new, and desire to secure by Letters Patent, is,—

1. In combination, a pair of relatively movable members, a rotatable bolt shaft carried by one of said members and axially movable into and out of locking engagement with the other member, said shaft having an eccentric portion, a collar having an opening of a size corresponding to that of the bolt shaft to permit an axial movement of the shaft therethrough, said collar being adapted to coöperate with the eccentric portion of the shaft and be moved thereby into and out of locking relation to the bolt shaft to permit or prevent an axial movement thereof through the collar, and means operable to coact with said collar to prevent or permit movements thereof transverse to the bolt shaft.

2. In combination, two relatively movable members, a bolt shaft carried by one member for rotary and axial movements and axially movable into and out of locking engagement with the other member, said shaft having axially spaced eccentric portions, a locking dog disposed at one side of the shaft and having a collar projecting therefrom and embracing the shaft to permit axial movements of the shaft therethrough, said collar when in register with either eccentric portion of the shaft being adapted to coact therewith to lock the shaft against axial movements and being operated by a predetermined rotation of the shaft to move the collar to place its opening into axial register with the shaft axis to permit an axial movement of the shaft therethrough, means preventing a rotation of said dog and collar, and means operable to coact with said dog to prevent or permit a movement of the dog transverse to the shaft to place its collar into shaft releasing position.

3. In combination, two relatively movable members, a bolt shaft carried by one member for rotary and axial movements and axially movable into and out of locking engagement with the other member, said shaft having axially spaced eccentric portions, a locking dog disposed at one side of the shaft and having a collar projecting therefrom and embracing the shaft to permit axial movements of the shaft therethrough, said collar when in register with either eccentric portion of the shaft being adapted to coact therewith to lock the shaft against axial movements and being operated by a predetermined rotation of the shaft to move the collar to place its opening into axial register with the shaft axis to permit an axial movement of the shaft therethrough, means preventing a rotation of said dog and collar, a rotatable ring encircling said dog and shaft and adapted when in one position of its movement to release the dog to permit movements thereof transverse to the shaft to unlock the shaft for axial movements, and control means rotatable relative to said ring and operable to place it in dog unlocking position.

4. In combination, two relatively movable members, a bolt shaft carried by one member for rotary and axial movements and axially movable into and out of locking engagement with the other member, said shaft having axially spaced eccentric portions, a locking dog disposed at one side of the shaft and having a collar projecting therefrom and embracing the shaft to permit axial movements of the shaft therethrough, said collar when in register with either eccentric portion of the shaft being adapted to coact therewith to lock the shaft against axial movements and being operated by a predetermined rotation of the shaft to move the collar to place its opening into axial register with the shaft axis to permit an axial movement of the shaft therethrough, means preventing a rotation of said dog and collar, a plurality of relatively rotatable rings encircling said dog and shaft and adapted, when each is in a predetermined position of its rotary movement, to release the dog for shaft unlocking movements, and means rotatably operable to relatively move said rings to place them in dog unlocking position.

In testimony whereof I have hereunto signed my name to this specification.

OTTO J. MANTHEY.